United States Patent [19]

Kakihana et al.

[11] 4,059,670

[45] Nov. 22, 1977

[54] METHOD FOR SEPARATION AND ENRICHMENT OF ISOTOPES

[75] Inventors: Hidetake Kakihana, Tokyo; Tokuhisa Miyamatsu, Nagoya, both of Japan

[73] Assignee: Mitsubishi Rayon Co., Ltd., Tokyo, Japan

[21] Appl. No.: 637,112

[22] Filed: Dec. 3, 1975

[30] Foreign Application Priority Data

Dec. 9, 1974 Japan .................................. 49-141354

[51] Int. Cl.² .................... C01G 56/00; C01G 43/00
[52] U.S. Cl. ............................. 423/7; 252/301.1 R; 423/6; 423/276; 423/283
[58] Field of Search ................. 423/6, 7, 298, 276, 423/283; 252/301.1 R; 210/31 C

[56] References Cited

U.S. PATENT DOCUMENTS

| | | | |
|---|---|---|---|
| 3,511,620 | 5/1970 | Shimokawa et al. | 423/7 |
| 3,953,568 | 4/1976 | Seko et al. | 423/7 |

*Primary Examiner*—Benjamin R. Padgett
*Assistant Examiner*—Deborah L. Kyle
*Attorney, Agent, or Firm*—Oblon, Fisher, Spivak, McClelland & Maier

[57] ABSTRACT

Boron or uranium isotopes can be chemically separated and enriched with high speed and with high separating efficiency by using weakly basic anion exchange fibers having a diameter of not more than 100 $\mu$, an aspect ratio of at least 5 and an exchange capacity of at least 2 meq/g-dry fiber, which are packed in a column at a specific volume of 2.0 – 20.0 ml/g-dry fiber.

9 Claims, No Drawings

METHOD FOR SEPARATION AND ENRICHMENT OF ISOTOPES

BACKGROUND OF THE INVENTION

The present invention relates to a method for chemically separating and enriching boron and uranium isotopes with high speed.

Boron-10 which is contained in an amount of 19.84% in natural boron and uranium -235 which is contained in an amount of 0.7196% in natural uranium are useful as a neutron absorber and a nuclear fuel, respectively.

As one of the methods for separation and enrichment of these boron and uranium isotopes, various proposals using ion exchanger have been made. However, in all of these methods, the difference in selectivity of the isotopes to an ion exhanger (separation factor) is very small and separation of the isotopes by ion exhanging becomes very difficult.

In order to separate such isotopes having extremely small separation factors to a satisfactory extent, the objective isotopes must be successively enriched by repeating the separation and enrichment operations many times. From the industrial view point, it is necessary to raise the separating efficiency per one operation or to raise the speed without lowering the separating efficiency. However, there is an inverse correlation between the separating efficiency and the increase of speed and so there is a limit in said method when ordinary ion exchange resins are used.

In view of such present circumstances regarding the technique of separating the isotopes by ion exchange method, the inventors have made intensive research to increase the separating efficiency and speed-up the separation to find that use of a fibrous weakly basic anion exchanger for separation and enrichment of boron and uranium isotopes provides favorable results. As a result, the present invention has been accomplished.

SUMMARY OF THE INVENTION

It is, therefore, an object of the present invention to separate and enrich boron and uranium isotopes in a high separating efficiency and with high speed.

The foregoing object is accomplished in accordance with the present invention by loading a solution containing anions of an isotope mixture of an element selected from boron and uranium in weakly basic anion exchange fibers which have a diameter of not more than 100 $\mu$, and aspect ratio (a ratio of length to diameter of fibers) of at least 5 and an exchanger capacity of at least 2 meq/g-dry fiber ("meq/g" is an abbreviation of milliequivalent/gram) and which are packed in a column in a specific volume of 2.0 - 20.0 ml/g-dry fiber and then eluting and developing said anions with an eluting agent to separately collect the frontal part and rear part of the effluent different in isotopic abundance ratio.

DESCRIPTION OF THE PREFERRED EMBODIMENTS

The present invention utilizes the theory that when anions containing boron or uranium isotope mixture is adsorbed to the top portion of a column packed with an anion exchanger and an eluting agent is passed therethrough, the adsorbed anions migrate downwards with repeated elution and re-adsorption to the anion exchanger and isotope-containing anions of lower selectivity are firstly eluted and isotope-containing anions of higher selectivity are concentrated in the rear part and eluted. Therefore, there are required such eluting conditions as sufficiently utilize the difference in selectivity in the course of the elution, namely, it is necessary to conduct the development with sufficient adsorption and desorption equilibrium at each step. Accordingly, the anion exchanger used in the method which utilizes said theory must be such that may rapidly conduct adsorption and desorption.

As methods using anion exchange resin, Kakihana who is one of the inventors of the present invention already reported a method for separation of boron isotope from boron in "Journal of Japan Chemical Society" No. 8, 1482 (1973) and a method for separation of uranium isotope from tetravalent uranium compound in Japanese Patent KOKAI(Laid-Open) No. 15,897/74. However, the conventionlly used anion exchange resins are practically not preferred for the reasons mentioned above. The greatest reason is that in the case of the generally used anion exchange resin, even if this is made porous or the degree of cross-linking is reduced, there is an increased time lag in reaching adsorption and desorption equilibrium between the outer layer part and the central part of the resin and so an increase in the remixing of the once separated isotopes cannot be avoided.

On the other hand, in the present invention, since anion exchange fibers having little distance between their outer layer part and central part are used, the adsorption and desorption can be rapidly accomplished and remixing of the once separated isotopes occurs with difficulty to obtain a high separating effect. Moreover, the time required for reaching equilibrium with the outer liquid is extremely short and the reaction speed is several hundreds to several thousand times as compared with the speed when the ordinary weakly basic anion exchange resin is used. Therefore, even when the flow rate is somewhat increased at elution, a high separating effect can be maintained.

Even if an anion exchange resin is used, the separating effect can be improved when the particle size is further decreased, but with decrease in the particle size, the through-penetrability of the liquid is abruptly reduced and even if the eluting agent is introduced under a high pressure, the flow rate cannot be sufficiently increased and deformation of the particles occurs due to the pressure, to increase the pressure loss to make it impossible to accomplish a high speed separation. Furthermore, when flow rate cannot be increased due to the use of ultrafine particles, the diffusion speed becomes higher to cause mixing of the once separated isotopes.

Since the weakly basic anion exchange fibers used in the present invention have the characteristic of thin and long shape, when they are packed in a column, spaces required for passing liquid are surely formed about intersections of the fibers and so they are markedly superior in the through-penetrability of liquid to particulated or powdered weakly basic anion exchange resin.

The weakly basic anion exchange fibers used in the present invention must satisfy the following requirements in their shape. Firstly, in order to raise the separating effect, the diameter is smaller the better for the reasons mentioned above and should be less than 100 $\mu$, but when it is too small, the through-penetrability of liquid is apt to decrease and so 50 - 1$\mu$ is a preferred range. Secondly, when the ratio of length of fibers to diameter of fibers (aspect ratio) is close to 1, the through-penetrability of liquid becomes low as in the case of finely particulated anion exchange resin and the aspect ratio should be at least 5 for securing a preferred through-penetrability of liquid. Thirdly, when length of the fibers is great, entanglement of the fibers occurs or coarse packing occurs at column wall portion when the fibers are packed in a column. Therefore, length of the fibers is less than 5 mm and is shorter the better. These characteristics on the shape are based on the measurement values in dried state.

The exchange capacity is higher the better for increasing the treating amount per unit amount of the anion exchange fibers and is at least 2 meq/g-dry fiber and preferably 4 - 10 meq/g-dry fiber.

Exchange groups may be any of primary, secondary, and tertiary amino groups and may also be a combination of two or more of these groups.

The weakly basic anion exchange fibers which satisfy said requirements may be produced by various methods. Examples thereof are as follows: (1) a polymer containing at least one of primary, secondary and tertiary amino groups, such as polyethyleneimine, polyvinylpyridine, etc. is blended with a fiber forming polymer, this blend is spun and then the resultant filamentary products are subjected to cross-linking treatment, (2) a compound having primary or secondary amine or amino group is reacted with fibers having at least one of nitrile, hydroxyl, amide, halogen, etc. which are capable of reacting with said compound, (3) amino groups are introduced into polystyrene fibers, novolak fibers, etc. in the same manner as in the case of anion exchange resins, and (4) a monomer compound comprising monovinyl monomer and divinyl monomer into which anion exchange groups can be introduced and a polymerization initiator is absorbed and swollen in starting fibers, then if necessary, component of the starting fibers is decomposed or dissolved and removed, and thereafter anion exchange groups are introduced. However, the anion exchange fibers of the present invention are not limited to those obtained by the methods enumerated above so long as they satisfy the requirements mentioned above.

Packing of the anion exchange fibers in a column may preferably be carried out by packing them as a slurry of the fibers dispersed in water. Specific volume at packed state should be 2.0 - 20.0 ml/g per dry weight of the anion exchange fibers used and preferably 2.0 - 8.0 ml/g-dry fiber for maintaining the exchange capacity per unit volume and obtaining sufficient through-penetrability of liquid.

As the solution containing anions of isotope mixture of an element selected from the group consisting of boron and uranium to which the present invention is applied; in the case of separating boron isotopes, it is advantageous to use an aqueous solution containing boron as anions with use of boric acid in view of the merits that no extra conditioning of the anion exchange fibers after completion of elution is required and no impurities are incorporated into the effluent by using cheap deionized water as an eluting agent and in the case of separating uranium isotopes it is advantageous to use an aqueous solution containing tetravalent uranium as complex anions, namely, an aqueous solution containing a tetravalent uranium compound, a polycarboxylic acid or a salt thereof and an inorganic acid or a salt thereof because of the tetravalent uranium being superior to hexavalent uranium in isotope separating effect.

Preferred conditions for separation of boron and uranium isotopes will be explained with reference to the cases of using boric acid for separation of boron isotopes and tetravalent uranium compound for separation of uranium isotopes.

Concentration and amount of the aqueous boric acid solution used for separation of boron isotopes vary depending on the exchange capacity of the anion exchange fibers and specific volume after packing. However, the concentration is within the range of 0.02 - 5 mol/l and generally with increase in concentration the amount of production increases, but separating effect decreases. Therefore, preferred concentration is about 0.1 - 3 mol/l.

Flow rate of eluting agent varies depending on length of bed in which the anion exchange fibers are packed, exchange capacity of the anion exchange fibers, specific volume after packing, temperature of liquid, etc., but it may be within the range of 1 - 2000 ml/hr/cm$^2$, preferably 20 - 1000 ml/hr/cm$^2$. The temperature of liquid is within the range of 0° - 100° C, preferably 10° - 80° C.

For separating boron into boron-10 and boron-11 according to the present invention, anions containing boron loaded in OH-form weakly basic anion exchange fibers are eluted with deionized water as an eluting agent and enrichment of boron-11 is effected at frontal part of effluent and that of boron-10 is effected at rear part of effluent to directly obtain each of them. However, in this case, sufficiently long column or plural columns in combination or in repetition may be used to highly raise the enrichment degree. This operation may also be employed in separation of uranium isotopes.

Explanation will be given with reference to enrichment of boron-10. Firstly, an effluent after treatment of one step is divided into fractions of frontal part of high boron-11 abundance ratio, central part of near the natural isotopic abundance ratio and rear part of high boron-10 abundance ratio. Regarding said central part, the total amount of boron can be divided into boron-10 enrich part and boron-11 enrich part by repeating the separation operation together with aqueous boric acid solution freshly fed. Boron-11 of higher purity can be obtained by carrying out the same operation on the boron-10 enrich part.

This separation of boron isotopes using boric acid successfully utilizes the characteristic that the ions exchanged and caught by the weakly basic anion exchange fibers are easily eluted by hydrolysis. Thus, this is the preferred method in that regeneration operation is semi-permanently unnecessary and moreover rapid separation is possible with improving the separating efficiency.

The aqueous solution containing tetravalent uranium as complex anions which is used in separation of uranium isotopes is an aqueous solution prepared by adding a polycarboxylic acid or salt thereof and an inorganic acid or a salt thereof to an aqueous solution of a tetravalent uranium compound such as uranous chloride, uranous bromide, uranous sulfate, uranous acetate, etc. to coordinate them to tetravalent uranium ion to form complex anions of tetravalent uranium. Examples of said polycarboxylic acid or salt thereof and inorganic acid or salt thereof capable of being coordinated with tetravalent uranium ions are polycarboxylic acids such as citric acid, malic acid, tartaric acid, etc. or salts thereof such as sodium salts, inorganic acids such as sulfuric acid, phosphoric acid, etc. or salts thereof such as sodium salts. The range of pH value preferred for forming complex anions is 2 - 10, especially preferably 2 - 9.

The concentration of tetravalent uranium ion in the aqueous solution is generally 0.02 - 0.5 mol/l, preferably 0.03 - 0.3 mol/l.

The feeding speed of uranium eluting agent for elution is generally 1 - 200 ml/hr/cm$^2$, preferably 10 - 100 ml/hr/cm$^2$.

The temperature of liquid is 0° - 100° C, preferably 10° - 80° C.

In order to separate uranium into uranium-235 and uranium-238, complex anions containing tetravalent uranium loaded in Cl-form or OH-form weakly basic anion exchange fibers are eluted with an eluting agent which is an aqueous solution of a polycarboxylic acid such as citric acid or a salt thereof such as sodium salt and an inorganic acid such as sulfuric acid or a salt thereof such as sodium salt as used in the formation of complex anion of tetravalent uranium. In this case, since uranium-238 forms more stable complex anions than uranium-235 due to chemical isotope saparating effect, uranium-238 is enriched in the rear part of effluent and uranium-235 is enriched in the frontal part and high speed separation of uranium-235 can be accomplished. This separation of uranium isotopes can be carried out by basically the same operation as in the separation of the boron isotopes and length, the number and combination of the column may be optionally chosen.

The present invention will be illustrated in the following Examples.

EXAMPLE 1

1.2 kg of fiber bundles having a single fiber denier of 0.8 and a total denier of 480,000 obtained by spinning a copolymer of 39% by weight of acrylonitrile and 7% by weight of vinyl bromide were treated in 20 l of 80% (by weight) aqueous solution of pentaethylenehexamine at 100° C for 3 hours. Thereafter, the treating solution was removed and the treated fibers were cut by a guillotine type cutter to produce weakly basic anion exchange fibers having an exchange capacity of 6.2 meq/g-dry fiber, a diameter of 21 μ and an aspect ratio of 95. Said fibers were subjected to conditioning with 0.5N-NaOH aqueous solution to obtain OH-form exchange fibers, which were then sufficiently washed with water and packed with running water in a column of 30 mm in inner diameter at a specific volume of 6.2 ml/g so that the packing length became 100 cm. Then, 0.412 mol/l of aqueous boric acid solution was loaded therein at a flow rate of 39 ml/hr/cm$^2$ and after the boric acid concentration in the effluent became the initial boric acid concentration, elution was effected with deionized water at a flow rate of 39 ml/hr/cm$^2$, during which the temperature in the column was kept at 25° C. Simultaneously with the start of the loading of the aqueous boric acid solution, 200 ml of the effluent was sampled at a time and measurements of boric acid concentration and boron isotopic abundance ratio (boron-10/boron-11 atomic ratio) on five fractions of the rear part were conducted by neutralization titration method and by an isotope abundance ratio measuring spectrometer (CH5 Type manufactured by Barian Mat AG of West Germany), respectively to obtain boric acid concentrations of 0.100, 0.052, 0.030, 0.016 and 0.007 mol/l and isotopic abundance ratios of boron-10 of 0.2937, 0.3004, 0.3055, 0.3141 and 0.3280 which were 1.187 time, 1.214 time, 1.234 time, 1.269 time and 1.325 time the isotopic abundance ratio of boron-10 in starting boric acid, namely, 0.2475, respectively.

The above operation was repeated under the same conditions except that an OH-form weakly basic anion exchange resin having an exchange capacity of 5.98 meq/g and a particle size of 20 - 50 meshes which was obtained by reacting chloromethylated styrene-divinylbenzene copolymer with polyethylenepolyamine was packed in the same column as used above at a specific volume of 2.6 ml/g in a length of 100 cm. Examination was conducted on five fractions of rear part to obtain boric acid concentrations of 0.054, 0.025, 0.014, 0.007 and 0.001 mol/l and isotopic abundance ratio of boron-10 of 0.2724, 0.2750, 0.2757, 0.2807 and 0.2943 which were 1.100 time, 1.111 time, 1.114 time, 1.134 time and 1.189 time those of natural boron.

EXAMPLE 2

Separation of boron isotopes was carried out under the same conditions as in Example 1 except that the OH-form weakly basic anion exchange fibers used in Example 1 were packed in a column of 30 mm in inner diameter by running water at a specific volume of 3.3 ml/g in a packing length of 70 cm and flow rate of aqueous boric acid solution and deionized water was 20 ml/hr/cm$^2$. As the results, the isotopic abundance ratios of boron-10 in the five fractions of rear part were 0.2970, 0.3021, 0.3089, 0.3175 and 0.3316 which were 1.200 time, 1.221 time, 1.248 time, 1.283 time and 1.340 time that of natural boron.

Separation of boron isotopes was carried out under the same conditions as in Example 1 except that the OH-form weakly basic anion exchange resin used in Example 1 and having 200 - 400 meshes was packed in a column of 30 mm in inner diameter at a specific volume of 2.4 ml/g in a packing length of 50 cm and flow rate of the aqueous boric acid solution and deionized water was adjusted to 2 ml/hr/cm$^2$ under a gage pressure of 1 kg/cm$^2$ by a compressor. As the result, the isotopic abundance ratios of boron-10 in the five fractions of the rear part were 0.2903, 0.2970, 0.3041, 0.3106 and 0.3245 which were 1.170 time, 1.200 time, 1.229 time, 1.255 time and 1.311 time that of natural boron.

That is, it was recognized that when the anion exchange fibers were used, the through-penetrability of liquid was excellent and so the productivity was about 10 times the productivity when the anion exchange resin was used.

EXAMPLE 3

Fiber bundles of polyvinyl chloride having a single fiber denier of 0.06 and a total denier of 5000 were impregnated with a monomer mixture of 90 parts by weight of vinylbenzyl chloride (orto-, para-mixture), 10 parts of weight of divinylbenzene and 0.8 part by weight of azobisisobutylnitrile to allow the mixture to be contained in an amount of 80% by weight of the fibers. The fibers were dipped in a water bath of 75° C for 5 hours to polymerize the monomer mixture absorbed in the fibers. Thus obtained polyvinylbenzyl chloride-containing fibers cross-linked with divinylbenzene were cut to 0.5 mm in length and then were loosened by crumpling to remove the bonding between the fibers. Thereafter, 100 g of said fibers were dipped in 2 l of 3% aqueous solution of dimethylamine at 30° C for 24 hours.

Thus obtained weakly basic anion exchange fibers having a diameter of 7 μ, an aspect ratio of 71 and an exchange capacity of 2.8 meq/g were conditioned to OH-form and then the resultant OH-form anion exchange fibers were packed in a column of 30 mm in inner diameter at a specific volume of 4.8 ml/g and in a packing length of 3 m by running water and a flow rate of 152 ml/hr/cm² was employed. This separation of boron isotopes was carried out under the same conditions as used in Example 1. The separating effect obtained was similar to that obtained in Example 1.

EXAMPLE 4

The Cl-form weakly basic anion exchange fibers obtained in Example 1 were further cut to an aspect ratio of 5 and were packed in a column of 20 mm inner diameter at a specific volume of 5.9 ml/g and in a packing length of 100 cm. An aqueous solution containing 0.1 mol/l of citric acid and 0.2 mol/l of sulfuric acid and adjusted to pH 6 was allowed to pass through said column to conduct the conditioning. Then, said conditioning solution to which 0.1 mol/l of uranous chloride (0.00725 molar ratio as uranium-235/uranium-238) was added was allowed to pass through said column at a flow rate of 20 ml/hr/cm² to load complex anions of tetravalent uranium in the anion exchange fibers and then the initial conditioning solution was allowed to pass therethrough to effect elution. 10 ml of effluent was sampled at a time and uranium isotopic abundance ratio (uranium-235/uranium-238) in three fractions of each of frontal part and rear part of uranium adsorbed band was measured by mass spectrometer to find that there was enrichment of uranium-235 in the frontal part and enrichment of uranium-238 in the rear part. The abundance ratios of uranium-235 were 0.00732, 0.00729 and 0.00727 counting from the foremost part in the frontal part fractions which were respectively 1.0097 time, 1.0055 time and 1.0028 time the enrichment of natural uranium. The abundance ratios of uranium-235 in the rear part fractions were 0.00719, 0.00722 and 0.00724 counting from the last part therein.

The OH-form weakly basic anion exchange resin of 200 meshes which was used in Example 1 was packed in the same column as in Example 1 at a specific volume of 2.3 ml/g and in a packing length of 100 cm and said conditioning solution was allowed to pass therethrough. Thereafter, the uranium solution was allowed to pass therethrough at a gage pressure of 2 kg/cm² and a flow rate of 10 ml/hr/cm² to load the complex anions of tetravalent uranium in the anion exchange resin and elution was conducted with the conditioning solution. 10 ml of effluent was sampled at a time and uranium abundance ratios (uranium-235/uranium-238) in three fractions of each of frontal part and rear part of said effluent were measured to obtain the abundance ratios of uranium-235 of 0.00728, 0.00727 and 0.00726 counting from the foremost part in the frontal part fractions which were 1.0041 time, 1.0028 time and 1.0014 time those of natural uranium and the abundance ratios of uranium-235 of 0.00723, 0.00724 and 0.00725 counting from the last part in the rear part fractions.

EXAMPLE 5

Through the column in which the same Cl-form weakly basic anion exchange fibers as used in Example 4 were packed was allowed to pass a conditioning solution which was an aqueous solution containing 0.03 mol/l of citric acid and 0.04 mol/l of sulfuric acid and having a pH of 4. Thereafter, an aqueous solution containing 0.03 mol/l of citric acid, 0.04 mol/l of sulfuric acid and 0.03 mol/l of uranous chloride and having a pH of 4 was fed to the column from top of the column at a flow rate of 25 ml/hr/cm² to load complex anions of tetravalent uranium in the anion exchange fibers and then said conditioning solution was allowed to pass through the column to effect elution. 10 ml of effluent was sampled at a time and uranium abundance ratios (uranium-235/uranium-238) in three fractions of each of frontal part and rear part of said effluent were measured to find enrichment of uranium-235 in the frontal part and that of uranium-238 in the rear part. The uranium-235 abundance ratios were 0.00733, 0.00730 and 0.00727 counting from the foremost part in the frontal part fractions which were 1.0110, 1.0069 and 1.0028 time those of natural uranium and the uranium-235 abundance ratios in the rear part fractions were 0.00717, 0.00721 and 0.00723 counting from the last fractions in the rear part.

Furthermore, said conditioning solution was allowed to pass through a column in which the same OH-form weakly basic anion exchange resin as used in Example 4 was packed. Then, the uranium solution was allowed to pass through the column at a gage pressure of 2 kg/cm² and a flow rate of 10 ml/hr/cm² to load the complex anions in the exchange resin. Then, elution was carried out with said conditioning solution. The effluent was sampled and uranium abundance ratios (uranium-235/uranium-238) were measured in the same manner as mentioned above to obtain uranium-235 abundance ratios in the frontal part fractions of 0.00729, 0.00727 and 0.00726 counting from the foremost part therein which were 1.0055 time, 1.0028 time and 1.0014 time the enrichment of natural uranium and uranium-235 abundance ratios in the rear part fractions of 0.00722, 0.00724 and 0.00725 counting from the last part therein.

What is claimed is:

1. A method for separation and enrichment of isotopes, which comprises
    loading a solution containing anions of a mixture of isotopes of an element selected from the group consisting of boron and uranium into weakly basic anion exchange fibers which have a diameter of not more than 100 $\mu$m, a length of not more than 5 mm, an aspect ratio of at least 5 and an exchange capacity of at least 2 meg/g-dry fiber, and which are packed with a specific volume of 2.0 - 20.0 ml/g-dry fiber and
    then eluting said anions with an eluting agent at a temperature of 0°-100° C.

2. The method of claim 1, wherein an aqueous boric acid solution is used as said solution containing anions of a mixture of isotopes of boron.

3. The method of claim 1, wherein an aqueous solution of a mixture of a tetravalent uranium compound, a polycarboxylic acid or a salt thereof, and an inorganic acid or a salt thereof, is used as said solution containing anions of a mixture of isotopes of uranium.

4. The method of claim 2, wherein the concentration of said aqueous boric acid solution is 0.02 - 5 mol/l.

5. The method of claim 3, wherein the concentration of tetravalent uranium ion in said aqueous solution of tetravalent uranium compound is 0.02 - 0.5 mol/l.

6. The method of claim 2, wherein water is used as the eluting agent.

7. The method of claim 3, wherein an aqueous solution of a mixture of a polycarboxylic acid or a salt thereof, and an inorganic acid or a salt thereof, is used as the eluting agent.

8. The method of claim 6 wherein the flow rate of the eluting agent is 1 - 2000 ml/hr/cm².

9. The method of claim 7 wherein the flow rate of the eluting agent is 1 - 2000 ml/hr/cm².

* * * * *